Oct. 11, 1955  W. B. KOCHNER  2,720,329
LIQUEFIER LID SEAL
Filed Sept. 13, 1952
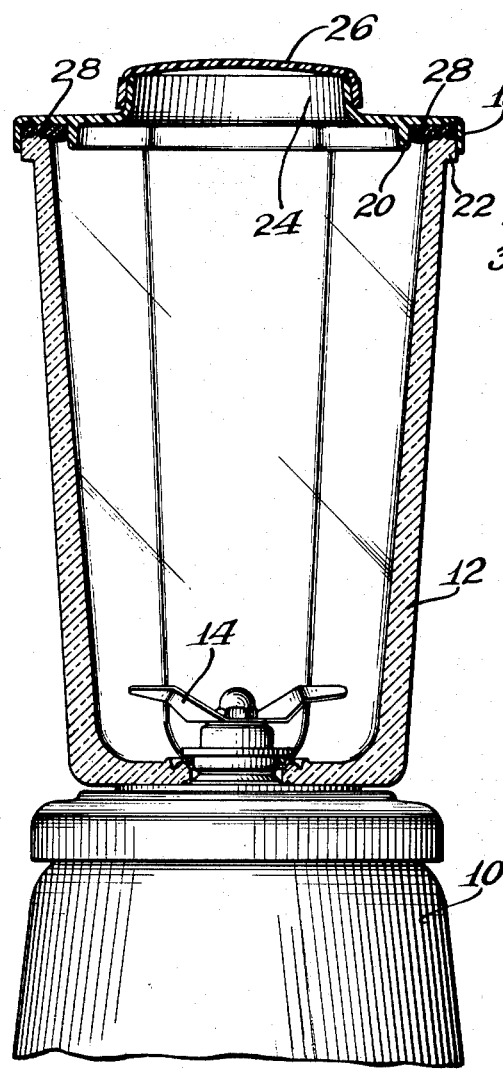
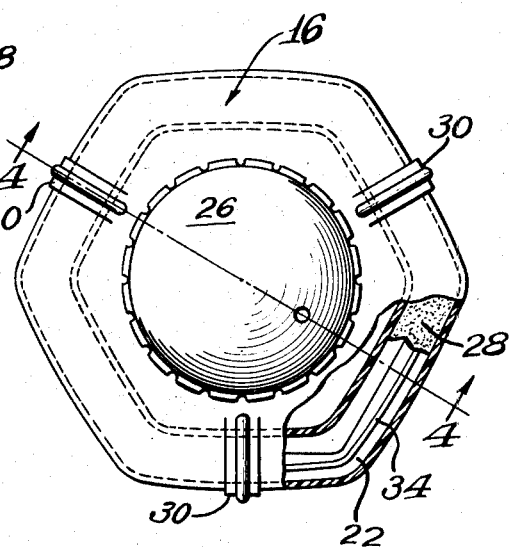
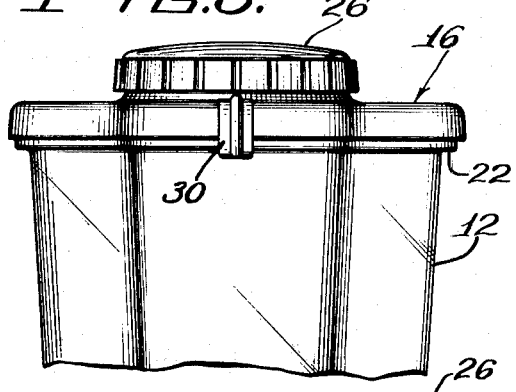
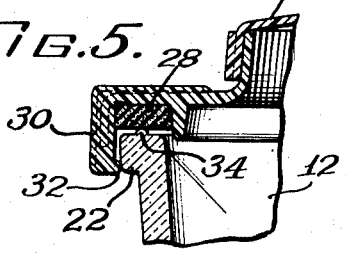
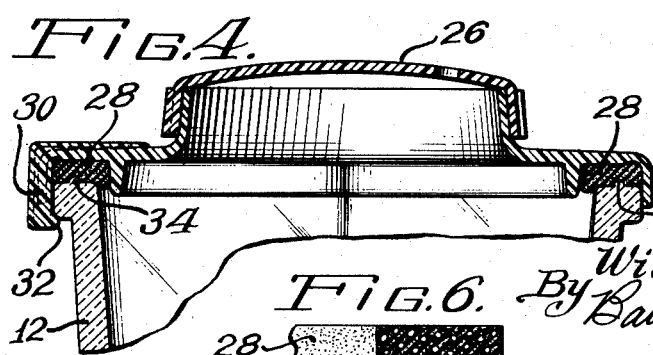
Inventor:
William B. Kochner
By Baird, Freeman & Molinare
Attys.

2,720,329
LIQUEFIER LID SEAL

William B. Kochner, St. Louis, Mo., assignor to Knapp-Monarch Company, St. Louis, Mo., a corporation of Delaware Application September 13, 1952, Serial No. 309,543

3 Claims. (Cl. 215—40)

This invention relates to a mixer for liquids and semi-solids such as the type known as a "liquidizer" and shown in the Kochner and McCarron patent, No. 2,585,255. The present invention has to do particularly with the lid therefor.

One object of the invention is to provide a lid which is effectively sealed to the bowl of the mixer so that the contents of the bowl are not ejected from the bowl between its upper edge and the lid when the mixing and/or cutting knives for mixing, cutting, blending, grinding and similar operations on liquids and semi-solids placed in the mixer bowl are in operation.

Another object is to provide a lid having a gasket in a groove thereof, which may be adequately compressed by the mere "snap-on" application of the lid to the bowl without the necessity of having to separately operate fastening devices for holding the lid on the bowl and at the same time compressing the gasket between the lid and the bowl.

A further object is to provide a lid structure for co-operation with the upper edge of a bowl which has an out-turned flange around this edge, the lid structure having at least three hook-like projections to cooperate with the flange and draw the lid toward the flange with a gasket of special construction between the two being readily compressed thereby. The gasket specifically is of the sponge rubber type in which the air cells in the rubber are sealed individually with respect to each other.

Still a further object is to provide a bead on the top of the flange which extends up into the gasket for making the seal more effective.

With these and other objects in view, my invention consists in the construction, arrangement and combination of the various parts of my liquefier lid seal, whereby the objects contemplated are attained, as hereinafter more fully set forth, pointed out in my claims and illustrated in the accompanying drawings, wherein:

Figure 1 is a side elevation of a "liquidizer" with the bowl thereof and my lid and lid seal shown in section.

Figure 2 is a plan view of Figure 1 with a portion of the lid broken away, other portions thereof shown in section, and showing a plan view of a portion of the bowl.

Figure 3 is a side elevation of the upper portion of Figure 1.

Figure 4 is an enlarged sectional view on the line 4—4 of Figure 2.

Figure 5 is a similar sectional view of the left-hand portion of Figure 4, showing the operation of the parts during the placing of the lid on the bowl; and Figure 6 is an enlarged sectional view through the gasket per se, showing the sealed cell construction thereof.

On the accompanying drawing I have used the reference numeral 10 to indicate the base of a "liquefier" and 12 the bowl thereof. Within the bowl, cutter blades 14 are mounted on a shaft which is driven by a motor (not shown) in the base 10.

My lid for the bowl is shown generally at 16 and it has a down-turned flange 18 outside the bowl and a down-turned flange 20 inside the bowl. The flange 18 snugly surrounds an out-turned flange 22 at the top of the bowl 12 as shown in the sectioned part of Figure 2.

The lid 16 has a neck 24 adapted to be covered by a cover member 26. The lid 16 and the cover member 26 are advantageously made of plastic material so as to be light in weight and somewhat resilient. They are slightly tapered as illustrated to provide a seal and gripping of their adjacent surfaces which normally hold the cover on the lid.

Interposed between the lid 16 and the flange 22 is a gasket 28 of such shape and size as to fit snugly between the depending flanges 18 and 20. The gasket 28 is of sponge rubber, preferably of the type having the air cells therein individually sealed with respect to each other as shown in the enlarged sectional view of Figure 6. It, therefore, does not become impregnated with the liquid that might be contained in the bowl 12 in the manner of ordinary sponges used for washing purposes where the cells communicate with each other. Accordingly, my gasket is readily washed and retained in sanitary condition.

I provide a comparatively simple means to bias the lid 16 downwardly and at the same time compress the gasket 28 as shown in Figure 4 consisting of lugs 30 at three different points around the lid 16 as shown in Figure 2. These are provided with hook-like ends 32 to fit under the flange 22 as in Figure 4 and to assume this position, they are first sprung out over the outer edges of the flange 22 as shown in Figure 5 by downward pressure on the lid 16. Then when the hooks 32 come under the flange as in Figure 4, there is a tendency (due to the resiliency of the plastic material of which the lid is made) to pull the lid downwardly and this compresses the gasket so as to provide against all possibility of leakage between the lid and the bowl.

To aid in the sealing, there is a raised bead 34 around the top of the flange 22 which bites into the gasket as shown in Figure 4. This prevents water from the vortex formed in the bowl 12 during the rapid rotation of the blades 14 therein from spilling out between the lid and the bowl and running down into the mechanism of the base 10.

From the foregoing specification, it will be obvious that I have provided a simply operable lid structure including a gasket to prevent spilling of the contents of the liquefier during its operation. A mere snapping on and off of the lid is required for mounting in position with an effective seal or removing from position as desired. For discharging the contents from the bowl 12, the lid 16 need not be removed as the cover 26 can be removed and the contents poured out through the neck 24.

Some changes may be made in the construction and arrangement of the parts of my liquefier lid seal wtihout departing from the real spirit and purpose of my invention, and it is my intention to cover by my claims any modified forms of structure or use of mechanical equivalents which may be reasonably included within their scope.

I claim as my invention:

1. In a liquefier lid seal, a lid structure adapted for mounting on the top of a bowl having an out-turned flange, said lid structure having a first flange depending therefrom inside said flange of said bowl and a second flange depending therefrom outside of said flange of said bowl, said second flange snugly contacting the out-turned flange of said bowl and said first flange being inwardly spaced therefrom, a sealed cell sponge rubber gasket between said flanges of said lid, and depending lugs outside said second flange and widely spaced about the periphery of said lid for coaction with said flange of said bowl, said lugs having hook elements to extend under said flange of the bowl and draw said lid downwardly and at the same time compress said gasket between said lid and the bowl, said lid being formed of resilient material to bias said lugs into position with said hooks under said flange of the bowl.

2. In a liquefier lid seal, a lid structure adapted for mounting on the top of a bowl having an out-turned flange, said lid structure having a first flange depending therefrom inside said flange of said bowl and a second flange depending therefrom outside of said flange of said bowl, said second flange snugly contacting the out-turned flange of said bowl and said first flange being inwardly spaced therefrom, a sealed cell sponge rubber gasket between said flanges of said lid in snugly contacting engagement therewith, and depending lugs outside said second flange and widely spaced about the periphery of said lid for coaction with said flange of said bowl, said lugs having hook elements to extend under said flange of the bowl and draw said lid downwardly and at the same time compress said gasket between said lid and the bowl, said lid being formed of resilient material to bias said lugs into position with said hooks under said flange of the bowl.

3. In a liquefier lid seal, a lid structure adapted for mounting on the top of a bowl having an out-turned flange and a raised rib on said flange, said lid structure having a first flange depending therefrom inside said flange of said bowl and a second flange depending therefrom outside of said flange of said bowl, said second flange snugly contacting the out-turned flange of said bowl and said first flange being inwardly spaced therefrom, a sealed cell sponge rubber gasket between said flanges of said lid, and depending lugs outside said second flange and widely spaced about the periphery of said lid for coaction with said flange of said bowl, said lugs having hook elements to extend under said flange of the bowl and draw said lid downwardly and at the same time compress said gasket between said lid and the bowl and cause said raised rib to bite into said gasket, said lid being formed of resilient material to bias said lugs into position with said hooks under said flange of the bowl.

References Cited in the file of this patent

UNITED STATES PATENTS

| | | |
|---|---|---|
| 730,500 | Weir | June 9, 1903 |
| 1,427,133 | Taliaferro | Aug. 29, 1922 |
| 2,080,144 | Lufkin | May 11, 1937 |
| 2,329,442 | Popp | Sept. 14, 1943 |
| 2,546,566 | Schweizer | Mar. 27, 1951 |

FOREIGN PATENTS

| | | |
|---|---|---|
| 11,991 | Austria | May 25, 1903 |
| 537,729 | Great Britain | July 3, 1941 |
| 661,158 | Great Britain | Nov. 14, 1951 |